(12) United States Patent  
Grisleri et al.

(10) Patent No.: US 11,006,092 B2  
(45) Date of Patent: May 11, 2021

(54) ENHANCED STEREOSCOPIC IMAGING

(71) Applicant: Ambarella International LP, Santa Clara, CA (US)

(72) Inventors: Paolo Grisleri, Roveleto di Cadeo (IT); Omar Pighi, Parma (IT); Gabriele Camellini, Reggio nell'Emilia (IT); Iari Gabriel Marino, Guastalla (IT)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 16/437,280

(22) Filed: Jun. 11, 2019

(65) Prior Publication Data

US 2020/0213573 A1    Jul. 2, 2020

(30) Foreign Application Priority Data

Dec. 27, 2018  (IT) .................. 102018000021271

(51) Int. Cl.
  *H04N 13/204*  (2018.01)
  *H04N 13/324*  (2018.01)
  *H04N 13/398*  (2018.01)

(52) U.S. Cl.
  CPC ......... *H04N 13/204* (2018.05); *H04N 13/324* (2018.05); *H04N 13/398* (2018.05)

(58) Field of Classification Search
  CPC ... H04N 13/204; H04N 13/398; H04N 13/324
  See application file for complete search history.

(56) References Cited

U.S. PATENT DOCUMENTS

| | | | | |
|---|---|---|---|---|
| 5,852,672 | A * | 12/1998 | Lu ...................... | G01B 11/2441 |
| | | | | 382/154 |
| 2003/0081952 | A1* | 5/2003 | Geng .................. | H04N 13/239 |
| | | | | 396/427 |
| 2012/0058580 | A1* | 3/2012 | Xu ....................... | H04N 13/243 |
| | | | | 348/47 |
| 2013/0215235 | A1 | 8/2013 | Russell ........................ | 348/47 |
| 2014/0132734 | A1* | 5/2014 | Zhuang ................ | H04N 13/254 |
| | | | | 348/47 |
| 2015/0229915 | A1* | 8/2015 | Kirk ........................ | H04N 5/33 |
| | | | | 348/51 |
| 2017/0070726 | A1 | 3/2017 | Goldentouch et al. | |
| 2017/0142312 | A1* | 5/2017 | Dal Mutto ........... | H04N 13/243 |
| 2017/0356620 | A1* | 12/2017 | Kaehler ................ | F21V 19/006 |
| 2018/0031137 | A1* | 2/2018 | Zabatani ................. | H04N 5/33 |
| 2019/0133692 | A1* | 5/2019 | Mariampillai .......... | A61B 34/10 |

* cited by examiner

*Primary Examiner* — Joseph G Ustaris  
*Assistant Examiner* — Jill D Sechser  
(74) *Attorney, Agent, or Firm* — Christopher P. Maiorana, PC (57) ABSTRACT

An apparatus for enhancing stereoscopic imaging include a light projector, a stereo camera and a control circuit. The light projector may be configured to project a pattern of light in a direction. The pattern may include (i) a background pattern that illuminates an area along the direction and (ii) a textured pattern that varies an intensity of the light in the area. The stereo camera may be configured to generate two sequences of synchronized images by imaging the area. The control circuit may be configured to (i) control power to the light projector, (ii) receive the two sequences of synchronized images from the stereo camera and (iii) generate one or more output signals in response to the two sequences of synchronized images.

20 Claims, 8 Drawing Sheets

ENHANCED STEREOSCOPIC IMAGING

This application relates to Italian Application No. 102018000021271, filed Dec. 27, 2018, which is hereby incorporated by reference in its entirety.

FIELD OF THE INVENTION

The invention relates to stereo camera systems generally and, more particularly, to a method and/or apparatus for enhanced stereoscopic imaging.

BACKGROUND

Conventional stereo cameras are used in automotive applications to provide object detection and an improved view of the road to drivers. Under a variety of circumstances, the images created by the stereo cameras are poor. When ambient light levels are low, the cameras have difficulty providing sufficient details for object detection. When the ambient light levels are high, details are missing from areas in shadows. Even under normal lighting conditions, large smooth surfaces do not present sufficient detail for several image processing techniques, such as distance detection. A mechanism is lacking to provide texture in the dark, shadowy or smooth areas for use in the image processing techniques.

It would be desirable to implement enhanced stereoscopic imaging.

SUMMARY

The invention concerns an apparatus for enhancing stereoscopic imaging include a light projector, a stereo camera and a control circuit. The light projector may be configured to project a pattern of light in a direction. The pattern may include (i) a background pattern that illuminates an area along the direction and (ii) a textured pattern that varies an intensity of the light in the area. The stereo camera may be configured to generate two sequences of synchronized images by imaging the area. The control circuit may be configured to (i) control power to the light projector, (ii) receive the two sequences of synchronized images from the stereo camera and (iii) generate one or more output signals in response to the two sequences of synchronized images.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing enhanced stereoscopic imaging that may (i) provide texture to improve stereo vision, (ii) be low cost, (iii) be low power, (iv) operate in automotive compatible ranges, (v) operate in stationary applications, (vi) uses light-emitting diodes, (vii) be invisible to human eyes, (viii) be water proof, (ix) be automotive grade and/or (x) be implemented as one or more integrated circuits.

Embodiments of the invention generally provide a stereoscopic imaging system that includes a light projector to enhance synchronized images captures by a stereo camera. The system generally projects a pattern of light ahead of the stereo camera. The light pattern may improve stereo reconstruction quality. In various embodiments, the light may be visible to humans. In some embodiments, the light may be invisible to the humans (e.g., near infrared light). The projected pattern may be suitable to improve stereo detection over short range (e.g., from meters to approximately 10 meters). Other ranges may be implemented to meet the design criteria of a particular application.

The light pattern may be created by a dome covering one or more light sources. The dome may be built with a material transparent to selected source illuminator radiation. The dome may be built with different several techniques, such as three-dimensional shapes to generate caustic curves and/or silk-screened.

A single light projector may be sufficient for pinhole and common lenses in the stereo camera. Multiple light projectors may be implemented where multiple stereo cameras are utilized. The imaging system may be suitable for use with fisheye lenses by using more light sources. The imaging system may be suitable for automotive, mobile, robotics, surveillance and/or industrial applications.

Figure 1:
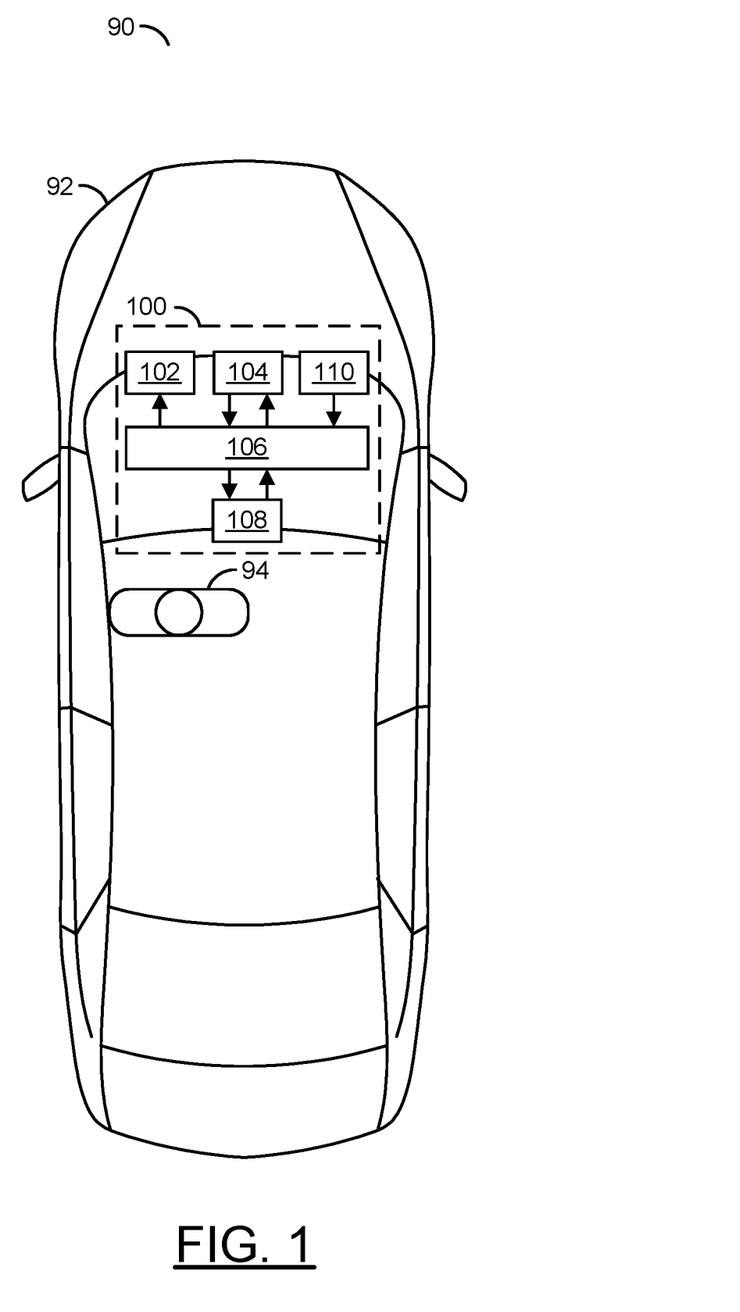
FIG. 1 is a block diagram of a system in accordance with an embodiment of the invention.

Referring to FIG. 1, a block diagram of a system 90 is shown in accordance with an embodiment of the invention. The system 90 generally comprises a platform (or structure) 92 and an apparatus (or stereoscopic system) 100. The apparatus 100 may be mounted inside and/or on the platform 92. The apparatus 100 may be implemented in hardware, software, firmware or any combination thereof in an apparatus. In some embodiments, the apparatus 100 may be a stereo digital video camera, a stereo digital still camera or a hybrid stereo digital video/still camera. In various embodiments, the apparatus 100 may be implemented using one or more integrated circuits.

In various embodiments, the platform 92 may implement a vehicle. The platform 92 may include, but is not limited to, an automobile, a truck, a train, a boat or similar vehicles. The platform 92 is generally operational to move about a ground surface and/or a water surface. In some embodiments, the platform 92 may be a robotic system, a surveillance system, and/or a stationary system, for example a workstation in an industrial application.

The apparatus 100 may be operational to acquire multiple (e.g., two) sequences of synchronized images of an environment around the platform 92. The synchronized images may be used in image processing techniques to extract data and/or enhanced imagery of a scene. The image processing techniques may estimate distances to objects and/or features within a field of view based on one or more disparity images among a sequence of disparity images obtained from the original images. The image processing techniques may also be used to generate data concerning the environment, such as objects, object sizes, object speeds and/or object directions. Some image processing techniques may be used to enhance a displayed image shown to a user (e.g., driver or operator) 94 of the platform 92. Other image processing techniques may be implemented to meet the design criteria of a particular application.

The apparatus 100 generally comprises one or more light projectors 102 (a single light projector is shown), a stereo camera 104, a control circuit 106, a user interface device 108 and a light sensor 110.

The light projector 102 may be operational to project a pattern of light in a particular direction. The pattern of light may create an optical structure on the scene ahead of the apparatus 100. The optical structure may provide details to the image processing techniques that would be lacking without the optical structure. The pattern of light in the optical structure may include a background pattern that illuminates an area along the particular direction and a textured pattern that varies an intensity of the light in the area. In various embodiments, a wavelength of the light may be near infrared (e.g., 850-940 nanometers), that is invisible to humans and so may not cause distractions. In other embodiments, the wavelength of the light may be in a visible domain for humans. The visible light may aid human vision of the areas illuminated by the pattern of light. In still other embodiments, the wavelength of the light may be multiple wavelengths in multiple spectrums (e.g., near infrared and visible). Other wavelengths may be implemented to meet the design criteria of a particular application.

The stereo camera may be configured to generate two sequences of synchronized images (or two synchronized video signals) by imaging the area illuminated by the light projector 102. The sequence of synchronized images may be presented to the control circuit 106. In various embodiments, the stereo camera may include pinhole cameras, normal cameras and/or fisheye-lens cameras. In some applications, other numbers of cameras may be implemented to meet the design criteria of a particular application.

The control circuit 106 may be configured to control power to the light projector 102, receive the two sequences of synchronized images from said stereo camera 104 and generate one or more output signals in response to the two sequences of synchronized images. The power control may include on/off control of electrical power to the light projector 102 and/or dimming control of the light created by the light projector 102.

The user interface device 108 may be operational to provide sensors to receive input commands from the user 94 and to display one or more scenes to the user 94. The user interface device 108 may be configured to enable the driver 94 to turn on/off the whole apparatus 100, configure the apparatus 100, display data and the like. The input commands may include, but are not limited to, manual on/off commands for controlling the power to the light projector 102 and manual dimming commands to control an intensity of the light created by the light projector 102. The displayed scenes may be generated based on the synchronized images captures by the stereo camera 104.

The light sensor 110 may be configured to generate a brightness signal by detecting an ambient light around the platform 92. The brightness signal may be presented to the control circuit 106.

Figure 2:
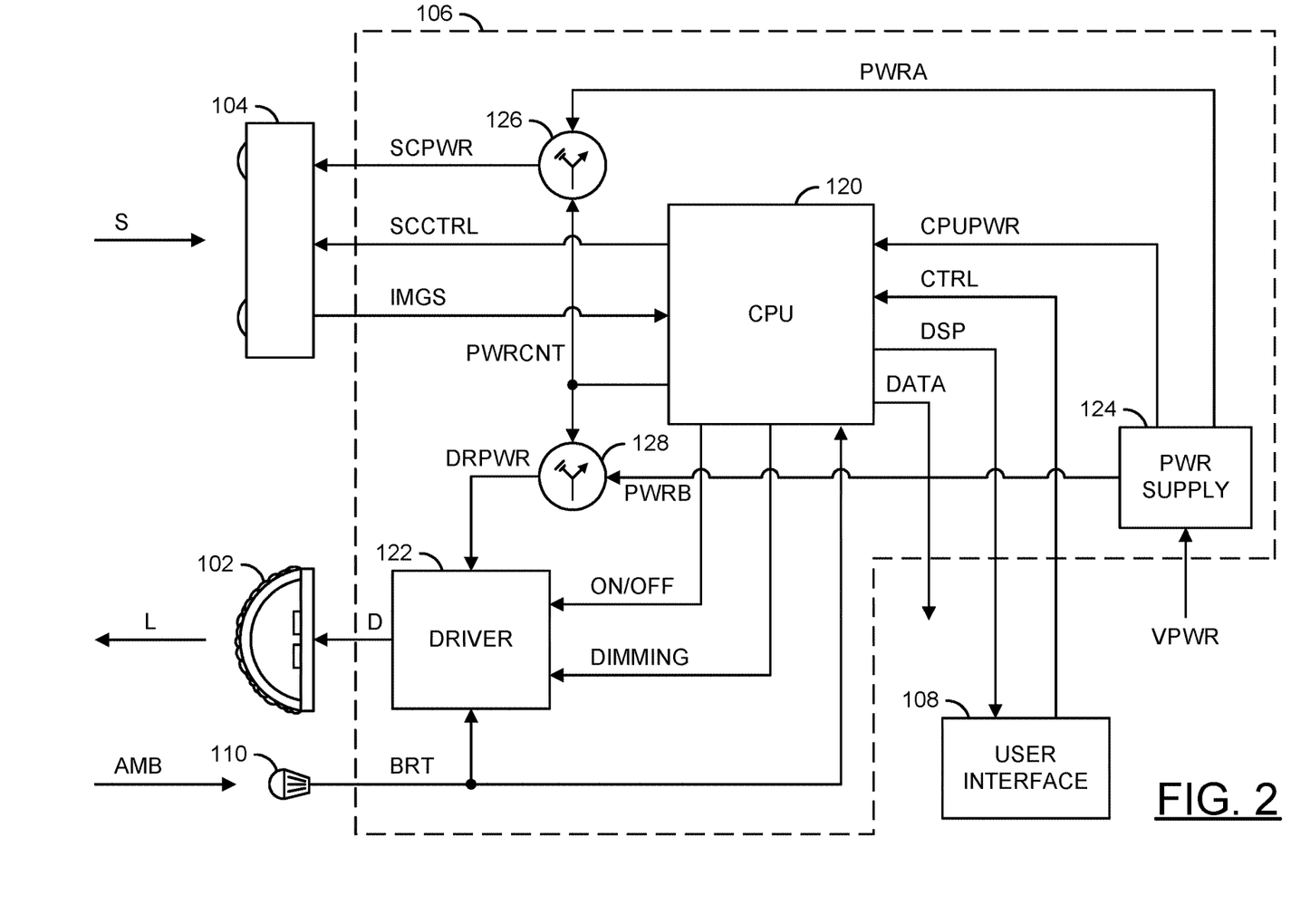
FIG. 2 is a diagram illustrating a control circuit in the apparatus in accordance with an example embodiment of the invention.

Referring to FIG. 2, a diagram illustrating an example implementation of the control circuit 106 is shown in accordance with an example embodiment of the invention. The apparatus 100 generally comprises a processor 120, a driver 122, a power supply 124, a power switch 126 and another power switch 128. The processor 120, the driver 122, the power supply 124, the power switch 126 and the power switch 128 may be implemented in hardware, software, firmware or any combination thereof in an apparatus. In various embodiments, the processor 120, the driver 122, the power supply 124, the power switch 126 and/or the power switch 128 may be implemented using one or more integrated circuits.

A signal (e.g., L) may be generated by the light projector 102. The signal L may be a light signal that projects a textured pattern. A signal (e.g., S) may be received by the stereo camera 104. The signal S may convey an optical view of the environment outside the platform 92. A signal (e.g., AMB) may be received by the light sensor 110. The signal AMB may be ambient light in the environment.

The power supply 124 may receive a signal (e.g., VPWR). The signal VPWR may carry a vehicle power (e.g., 12 volts DC) or a system power for static systems, such as surveillance applications. A signal (e.g., PWRA) may be generated by the power supply 124 and presented to the power switch 126. The signal PWRA may carry electrical power. A signal (e.g., PWRB) may be generated by the power supply 124 and presented to the power switch 128. The signal PWRB may also carry electrical power. A signal (e.g., CPUPWR) may be generated by the power supply 124 and received by the processor 120. The signal CPUPWR may be electrical power suitable to power the processor 120.

The power switch 126 may generate a signal (e.g., SCPWR). The signal SCPWR may carry electrical power for the stereo camera 104. A signal (e.g., PWRCNT) may be received by the power switch 126 from the processor 120. The power switch 128 may also receive the signal PWRCNT. The signal PWRCNT may convey power control information for the power switches 126 and 128. A signal (e.g., DRPWR) may be generated by the power switch 128 and received by the driver 122. The signal DRPWR may transfer electrical power to the driver 122. The driver 122 may generate a signal (e.g., D) provided to the light projector 102. The signal D may convey electrical power that powers the light projector 102.

The stereo camera 104 may receive the signal SCPWR from the power switch 126. A signal (e.g., SCCTRL) may be generated by the processor 120 and presented to the stereo camera 104. The signal SCCTRL may carry control information for control of the stereo camera 104.

The processor 120 may receive a signal (e.g., CTRL) from the user interface device 108. The signal CTRL may convey control information for the apparatus 100 from the user 94 entered through the user interface device 108. A signal (e.g., DSP) may be generated by the processor 120 and transferred to the user interface device 108. The signal DSP may be a display video signal carrying display images captured by the stereo camera 104. A signal (e.g., DATA) may also be generated by the processor 120 and transferred to other circuitry (not shown). The signal DATA may carry data extracted from the synchronized images captured by the stereo camera 104.

A signal (e.g., ON/OFF) may be generated by the processor 120 and received by the driver 122. The signal ON/OFF may contain information used by the driver 122 to switch power on and off to the light projector 102. A signal (e.g., DIMMING) may be generated by the processor 120 and transferred to the driver 122. The signal DIMMING may convey information used to adjust a brightness of the signal L generated by the light projector 102. The light sensor 110 may generate a signal (e.g., BRT). The signal BRT may be transported to the driver 122 and the processor 120. The signal BRT may contain data indicating an intensity of the ambient light detected in the signal AMB.

The processor 120 may be implemented as one or more central processing units (CPU). The processor 120 is generally operational to control the generation of the projected light signal L based on the ambient light signal AMB and the user control information received in the signal CTRL. The processor 120 may also be operational to control operations of the stereo camera 104 via the signal SCCTRL. Sequences of synchronized images captured by the stereo camera 104 may be processed by the processor 120. The processing generally includes, but is not limited to, object detection, determining object location, determining object motion, generating disparity images, generating a display image in the signal DSP, adjusting the projected light signal L, and formatting data from the synchronized images to present in the signal DATA.

The processor 120 may communicate with the user interface device 108 with one or more different communication links. In various embodiments, the processor 120 to user interface device 108 communication links may include, but are not limited to, Ethernet, an inter-integrated circuit (I2C) bus, a controller area network (CAN) bus, one or more serial links. Other standard interfaces/protocols and/or proprietary interface/protocols may be implemented to meet the design criteria of a particular application.

The driver 122 may be operational to drive and control the light projector 102. The driver 122 may control electrical power to the light projector 122 based on the signal ON/OFF, the signal DIMMING and the signal BRT. In various embodiments, the driver 122 may switch the electrical power to the light projector on and off. In other embodiments, the driver 122 may modulate the electrical power (e.g., pulse width modulation, varying the voltage and/or current, and the like) to control an intensity of the projected light signal L.

The operation of the light projector 102 may be static where the light projector 102 is turned on with the system and never turned off. The operational may be manual where the light projector 102 may be switched between on and off, and/or the current may be controlled manually by the driver 94 trough the user interface device 108 to adjust the brightness of the projected light L. The light projector 102 operation may include multiple preset states where the light projector 102 may be controlled (e.g., on/off and current) depending on day/night situations and/or time, with different presets depending on the ambient lighting conditions. The operation may also be dynamic where the light projector 102 operation may be controlled in a dynamic way by processor 120 and/or the light sensor 110, depending on different parameters. The dynamic operation may be based on an analysis of the stereo data, the signal BRT from the light sensor 110 and any other input related to the synchronized images, stereo disparity and/or light condition. For example, the current provided to the light projector 102 may be changed, depending on the information from the stereo camera 104, to fit the distance of the objects detected in the scene by the apparatus 100.

The power supply 124 may be operational to distribute electrical power in the signals PWRA, PWRB and CPUPWR. Raw electrical power for the signals PWRA, PWRB and CPUPWR may be derived from the power signal VPWR from a vehicle electrical system or a power system in other applications, such as surveillance applications.

The power switch 126 may be operational to control distribution of the electrical power received in the signal PWRA. Control may be based on the control information received in the signal PWRCNT.

The power switch 128 may be operational to control distribution of the electrical power received in the signal PWRB. Control may be based on the control information received in the signal PWRCNT.

Figure 3:
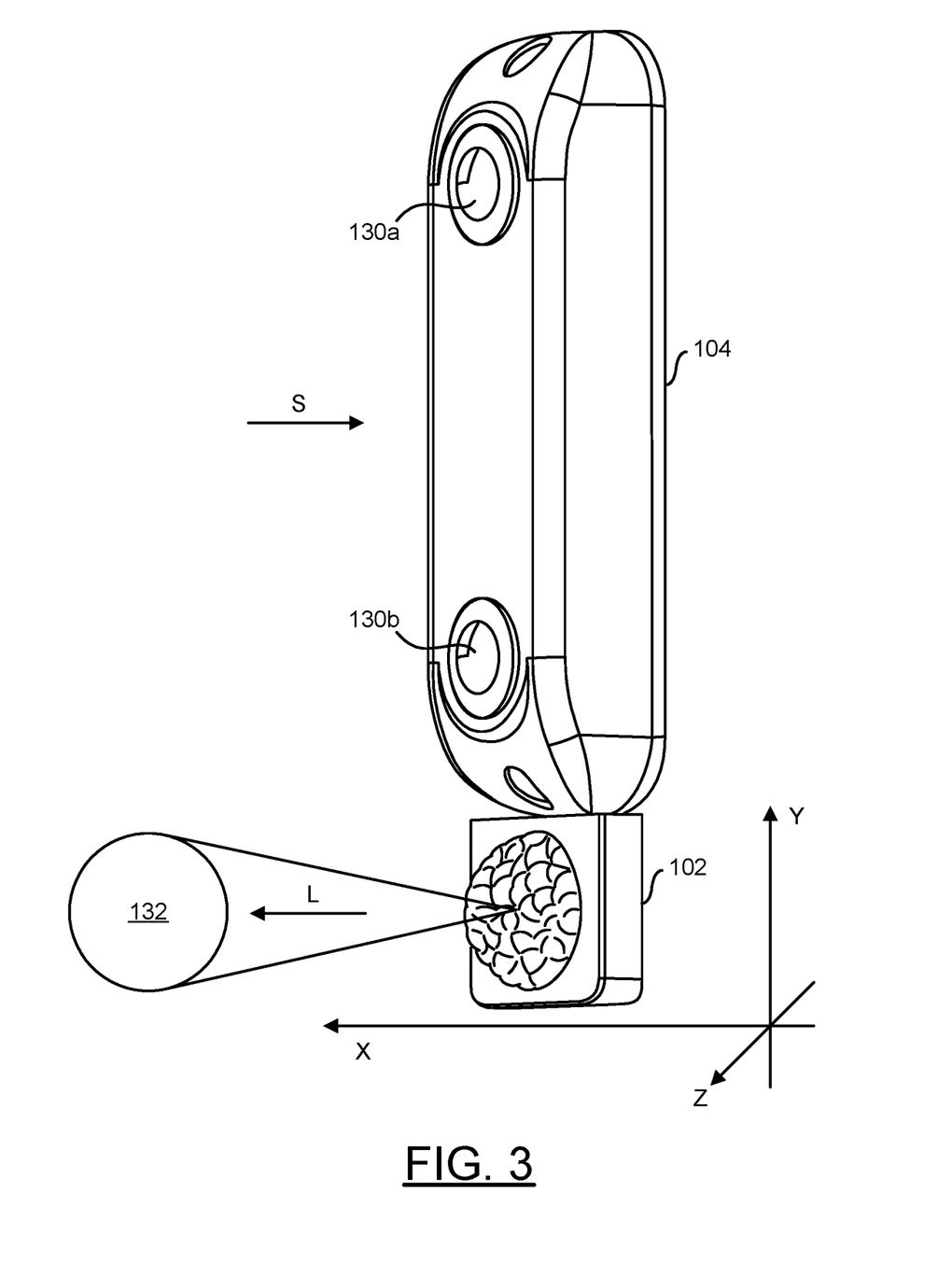
FIG. 3 is a diagram illustrating a light projector and a stereo camera in accordance with an example embodiment of the invention.

Referring to FIG. 3, a diagram illustrating an example implementation of the light projector 102 and the stereo camera 104 is shown in accordance with an example embodiment of the invention. In the example implementation, the stereo camera 104 may include two lenses 130a-130b. The lenses 130a-130b may be arranged in a line running in a direction (e.g., Y axis). The light projector 102 may be mounted adjoining one side of the stereo camera 104. In some embodiments, a center of the light projector 102 may be along the line defined by the lenses 130a-130b. Other arrangements between the light projector 102 and the stereo camera 104 may be implemented to meet the design criteria of a particular application.

Where a single light projector 102 is implemented, the light projector 102 and the lenses 130a-130b of the stereo camera 104 may be aligned in a common direction (e.g., X axis). The common direction X may be perpendicular to the orientation of the lenses 130a-130b along the axis Y. The light projector 102 may have a field of view 132 spanning two directions (e.g., Y axis and Z axis). The field of view 132 may reside in a plane normal to the X axis. In various embodiments, the field of view 132 may range from approximately 20 degrees to approximately 180 degrees symmetrically in each direction. In some embodiments, the field of view 132 may be asymmetrical, for example, wider horizontally than vertically. The light projector 102 may be attached externally to the stereo camera 104 as an external module or may be integrated inside a body of the stereo camera 104, depending on the application.

Figure 4:
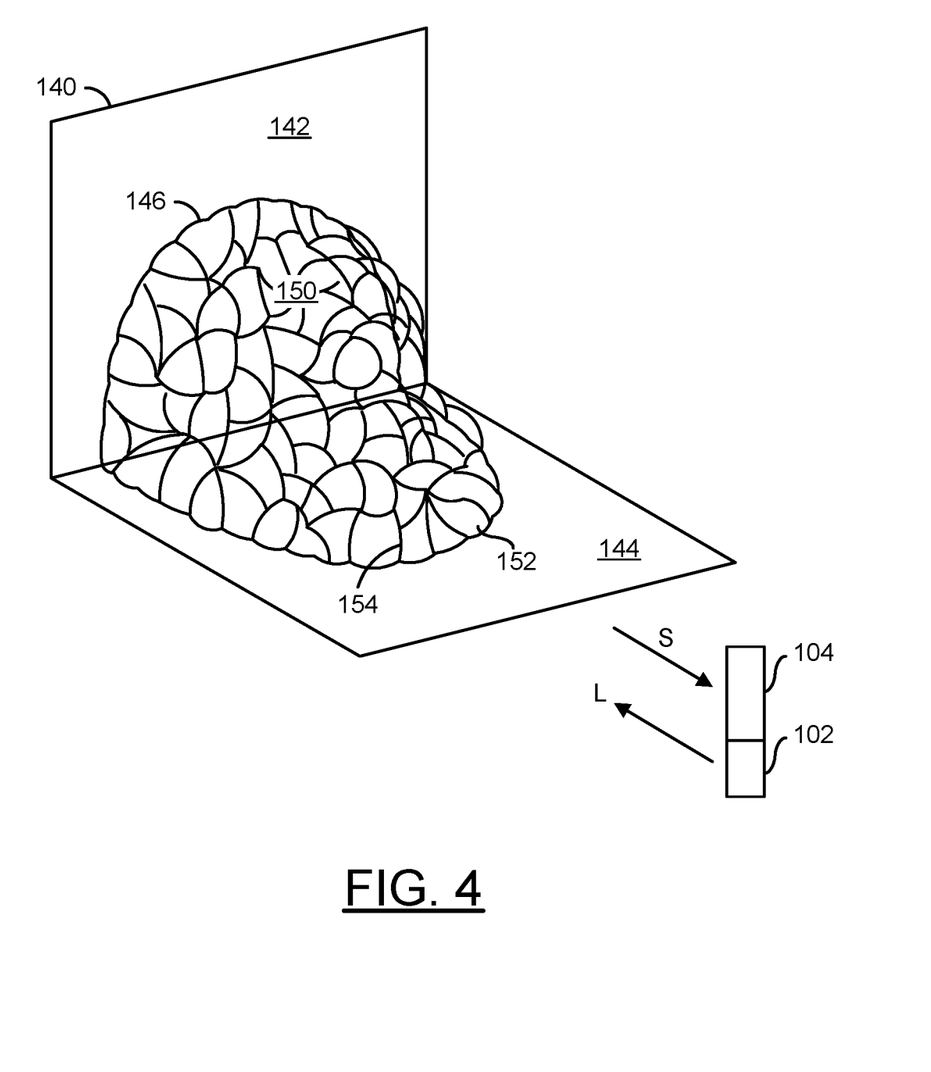
FIG. 4 is a diagram illustrating a pattern created by the light projector in accordance with an example embodiment of the invention.

Referring to FIG. 4, a diagram illustrating an example pattern 150 created by the light projector 102 is shown in accordance with an example embodiment of the invention. The environment 140 seen by the stereo camera 104 may include one or more vertical structures 142 and/or one or more horizontal structures 144. The light projector 102 may project the pattern 150 onto the vertical structures 142 and/or the horizontal structure 144 per the field of view 132. An area 146 of the environment 140 may be imaged by the stereo camera 104. In various embodiments, the area 146 seen by the stereo camera 104 may be smaller than the field of view 132 of the light projector 102 such that the entire area 146 is covered by the pattern 150.

The pattern 150 created by the light projector 102 generally includes a background pattern 152 and a textured pattern 154. The background pattern 152 (illustrated as white areas) may provide an approximately uniform illumination in the area 146. The textured pattern 154 (illustrated as dark lines) may provide a variable light intensity in the area 146. The textured pattern 154 may be regular or random. In various embodiments, pattern 150 may be static in intensity and/or texture or changing in intensity across time.

During operation, the light projector 102 may achieve several main effects. The light projector 102 may illuminate the environment 140 in the area 146 viewed by the stereo camera 104 that would otherwise be dark. The darkness may be because the scene is viewed at night, the scene is in strong shadows, or harsh sunlight created difficult lighting conditions that reduce apertures of the stereo camera 104. Furthermore, the light projector 102 generally allows a good stereo detection by projecting the pattern 150 on uniform areas.

Figure 5:
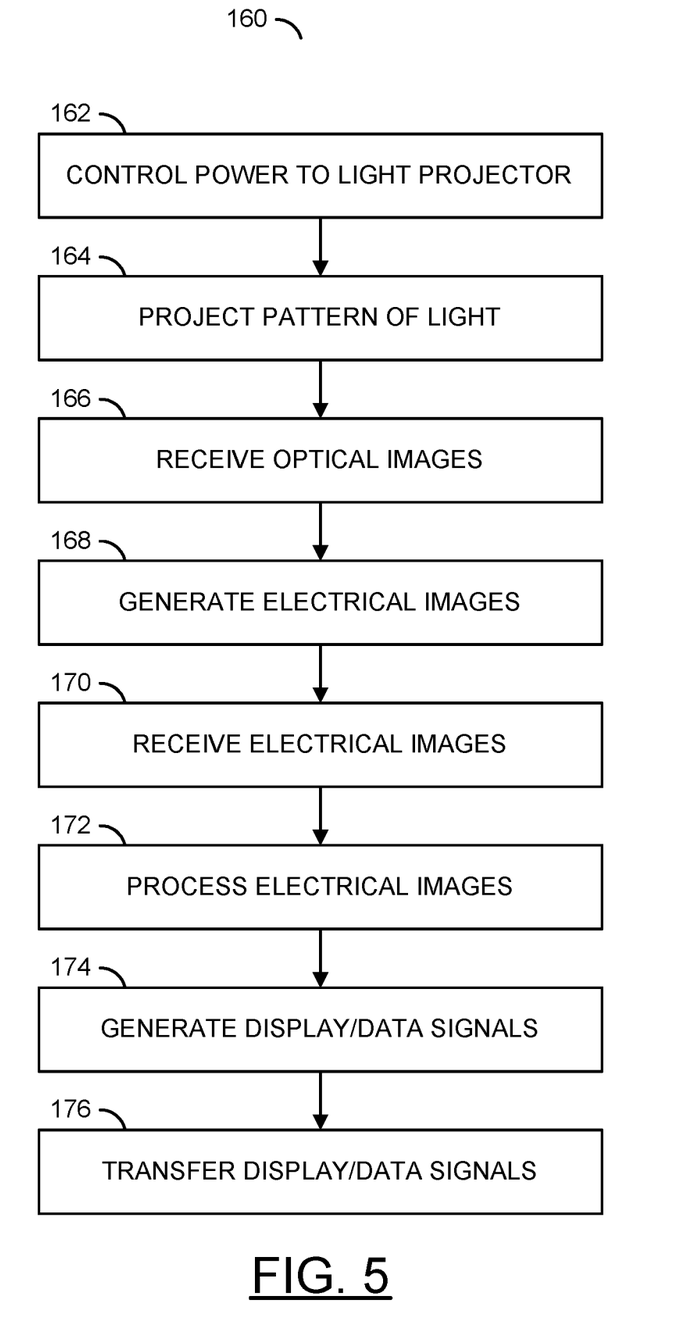
FIG. 5 is a flow diagram illustrating a method of operation in accordance with an example embodiment of the invention.

Referring to FIG. 5, a flow diagram illustrating an example method 160 of operation is shown in accordance with an example embodiment of the invention. The method (or process) 160 may be implemented by the apparatus 100. The sequence of the steps of the method 160 is shown as a representative example. Other step orders may be implemented to meet the design criteria of a particular application.

In step 162, the driver 122 may control the electrical power provided to the light projector 102. Based on the electrical power received, the light projector 102 may project the light signal L in step 164. The light signal L may illuminate the vertical structures 142 and/or the horizontal structures 144 in the area 140. The illuminating light and any other reflected light may be directed back toward the stereo camera 104 as optical images in the signal S.

In step 166, the stereo camera 104 may receive the optical images. The stereo camera 104 may convert the optical images in the signal S in step 168 into sequences of electrical synchronized images in the signal IMGS. The processor 120 may receive the sequences of synchronized images in the signal IMGS in step 170. The processor 120 may subsequently process the synchronized images in step 172. In step 174, the processor 120 may generate the display signal DSP and the data signal DATA based on the processed image data. The signals DSP and DATA may be transferred in step 176. The signal DSP may be transferred to the user interface device 108. The signal DATA may be transferred to other circuitry, such as obstacle detection circuitry.

Figure 6:
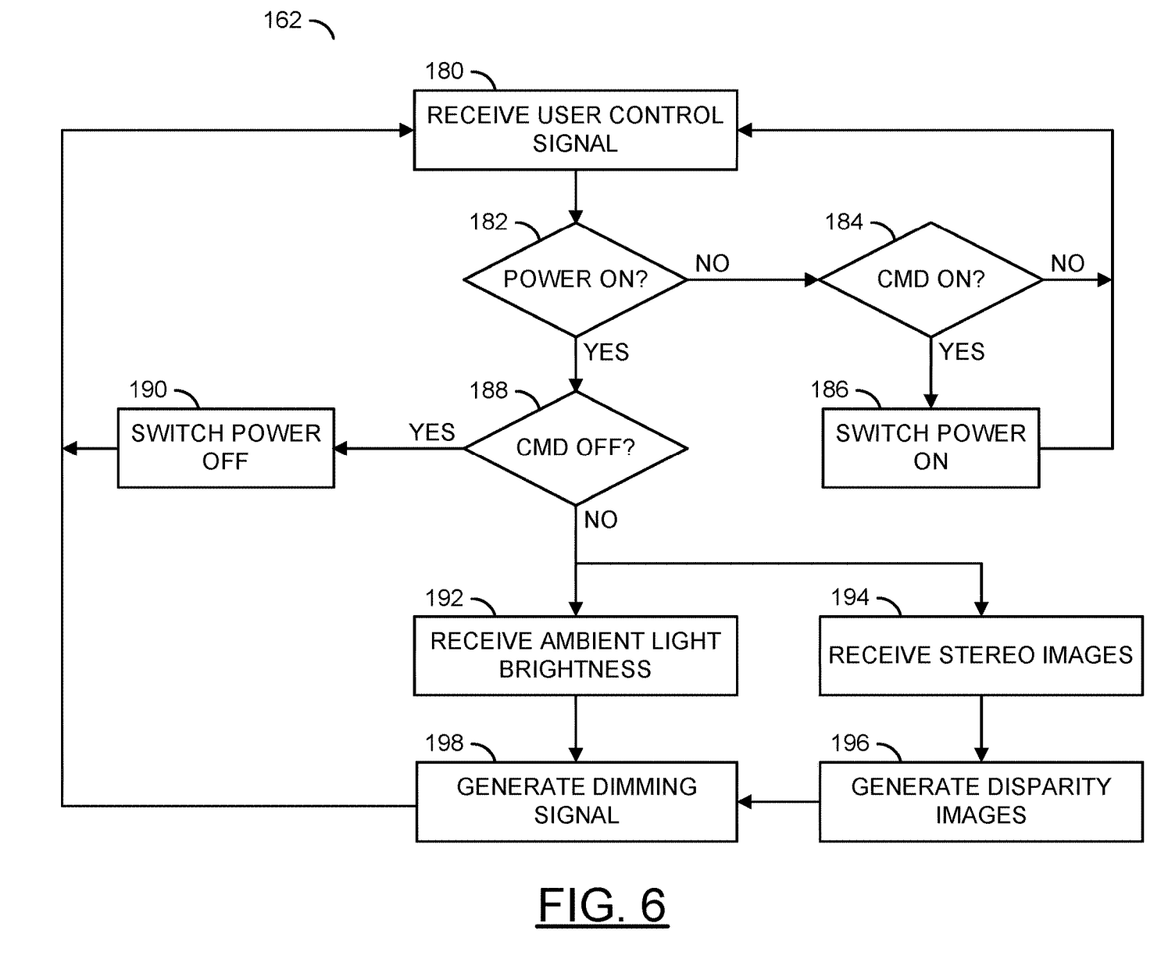
FIG. 6 is a flow diagram illustrating a power control step in accordance with an example embodiment of the invention.

Referring to FIG. 6, a flow diagram illustrating the power control step 162 is shown in accordance with an example embodiment of the invention. The step 162 may be implemented by the processor 120. The sequence of the steps is shown as a representative example. Other step orders may be implemented to meet the design criteria of a particular application.

In step 180, the processor 120 may receive the control signal CTRL from the user interface device 108. If the electrical power for the light projector 102 is not on per step 182, the received command is checked in step 184. If the received command is not to switch on power to the light projector 102, the flow may subsequently return to step 180 and wait for a next command. If the received command is to switch on power to the light projector 102, the processor 120 may instruct the power switch 128 to switch power from the signal PWRB to the signal DRPWR in step 186. The flow may subsequently return to the step 180 and wait for the next command.

If the electrical power for the light projector 102 is on per step 182, the received command is checked in step 188. If the received command is to switch off the light projector 102, the processor 120 may instruct the power switch 128 to remove electrical power from the signal DRPWR in step 190. The flow may subsequently return to the step 180 and wait for the next command.

If the received command is not to switch off power to the light projector 102 in step 188, the processor 120 may receive the ambient light brightness value in the signal BRT in step 192. The processor 120 may also receive the synchronized stereo image streams from the stereo camera 104 in step 194. In step 196, the processor 120 may generate one or more disparity images based on the synchronized image streams received from the stereo camera 104.

In step 198, the processor 120 may adjust the dimming value in the signal DIMMING up or down based on the ambient brightness level and a quality of the disparity images. For example, if the ambient light level is above a day threshold (e.g., daytime), the processor 120 may command the light projector 102 to dim the intensity of the light signal L. If the ambient light level is below a night threshold (e.g., nighttime), the processor 120 may command the light projector 102 to increase the intensity of the light signal L. The quality of the disparity images may result in adjustments to the light signal L. If the disparity images do not detect a number of points above a first threshold (e.g., the scene is too uniform), the processor may command the light projector 102 to increase the intensity of the light signal L. If the disparity images detect more points above a second threshold (e.g., the scene is clearly imaged), the processor 120 may command the light projector 102 to decrease the intensity of the light signal L. The flow may return to the step 180 to see if another command has been received from the user interface device 108.

Figure 7:
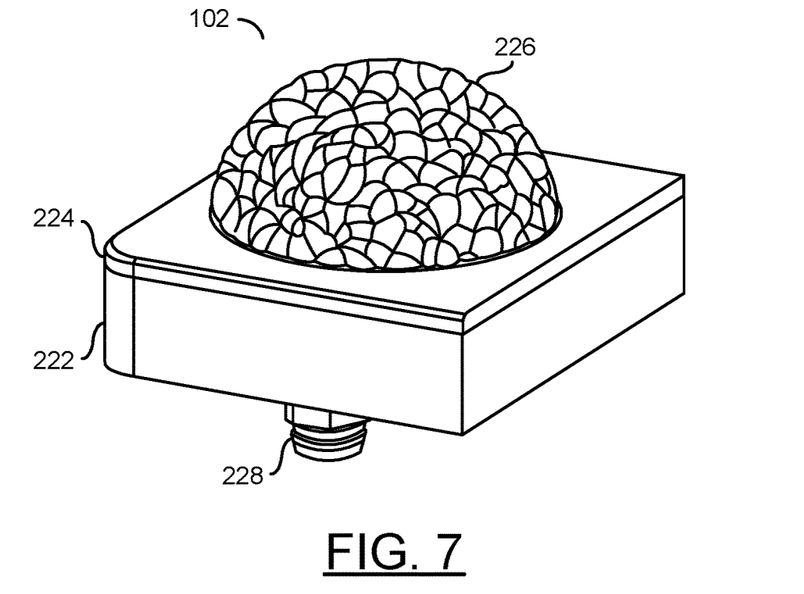
FIG. 7 is a diagram illustrating an implementation of the light projector in accordance with an example embodiment of the invention.

Referring to FIG. 7, a diagram illustrating an example implementation of the light projector 102 is shown in accordance with an example embodiment of the invention. The light projector 102 generally comprises a base 222, a lid 224, dome 226 and a connector 228. The base 222, the lid 224 and the connector 228 may be implemented in a hard plastic or other material suitable for automotive and/or industrial applications. The dome 226 may be implemented in a plastic transparent to the light emitted from the light projector 102.

Figure 8:
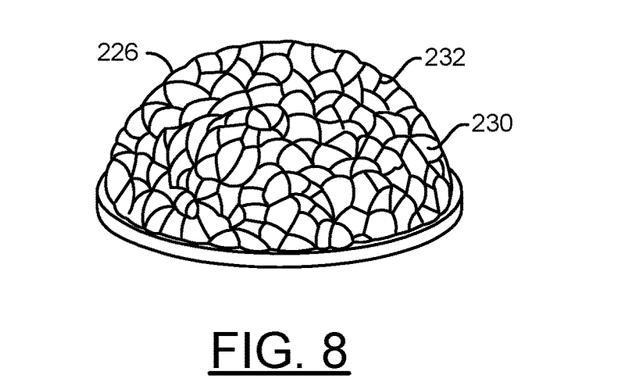
FIG. 8 is a diagram illustrating an implementation of a dome of the light projector in accordance with an example embodiment of the invention.

Referring to FIG. 8, a diagram illustrating an example implementation of the dome 226 is shown in accordance with an example embodiment of the invention. The dome 226 generally comprises a hemispherical shape suitable for projecting the light signal L in any direction within the hemisphere. The dome 226 may include areas 230 of uniform transparency and elements 154 of alternative transparency. The areas 230 may project a uniform illuminating light into the background pattern 152 on the vertical structures 142 and/or the horizontal structures 144 (see FIG. 4). The areas 232 may project a light of different intensity than the areas 230. The areas 232 generally create the textured pattern 154 on the vertical structures 142 and/or the horizontal structures 144 (see FIG. 4). The area 232 may create the pattern 154 with spatially random features. The area 232 may create the pattern 154 with a uniform illumination level or with spatially varying illumination levels. In various embodiments, the dome 226 may be built with any one of several different techniques, such as three-dimensional shapes to generate caustic curves, and/or silk-screened patterns.

Figure 9:
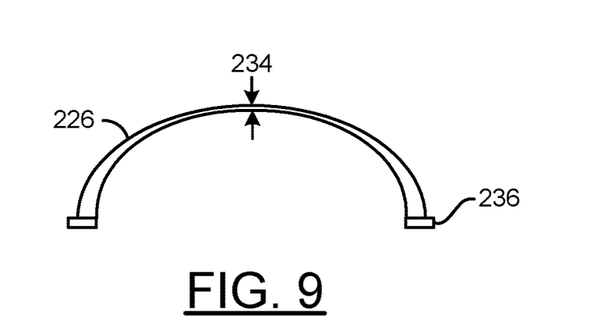
FIG. 9 is a diagram illustrating a cross section of the dome in accordance with an example embodiment of the invention.

Referring to FIG. 9, a diagram illustrating an example cross section of the dome 226 is shown in accordance with an example embodiment of the invention. A thickness 234 of the dome 226 may vary spatially from the outside to the top center. For example, the thickness 234 of the dome 226 may be thinnest at a top central and thickest near a flange 236 around a bottom of the hemisphere. The varying thickness 234 may be shaped to act as a lens that bends the light rays up to 180 degrees. Other thicknesses and thickness variations may be implemented to meet the design criteria of a particular application.

Figure 10:
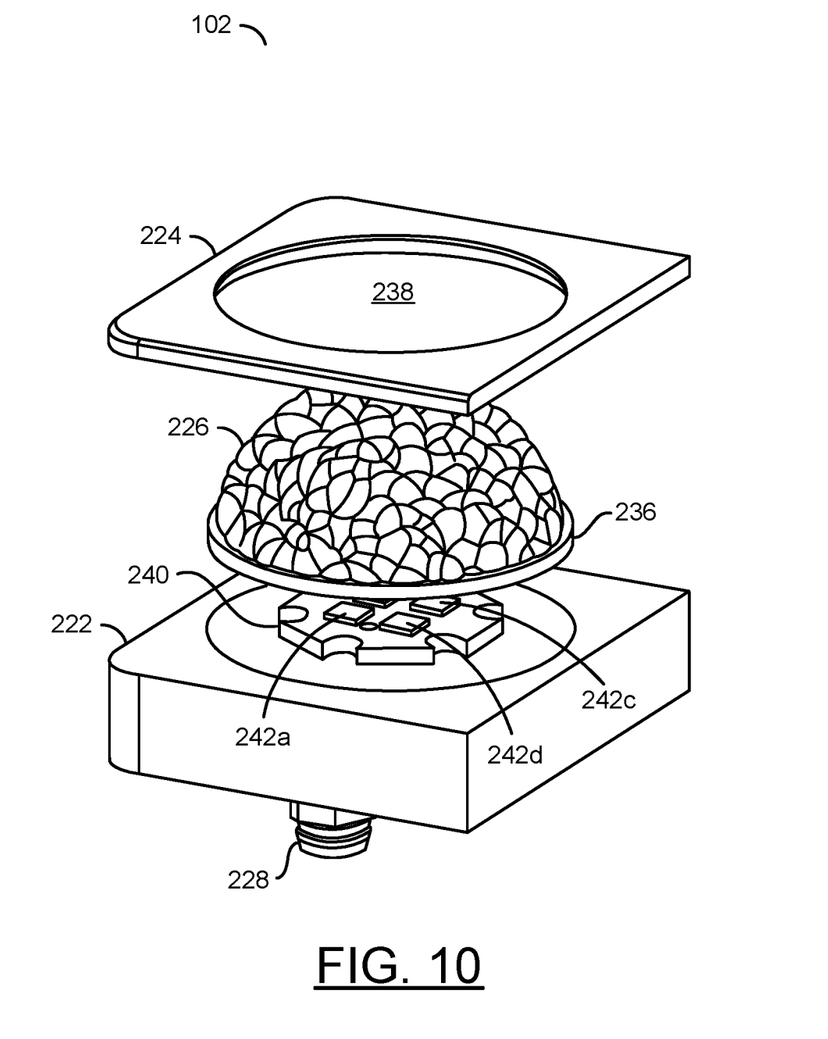
FIG. 10 is a diagram illustrating an exploded view of the light projector in accordance with an example embodiment of the invention.

Referring to FIG. 10, a diagram illustrating an exploded view of the light projector 102 is shown in accordance with an example embodiment of the invention. The lid 224 may include an aperture 238. The aperture 238 may be sized to allow all of the dome 226, except the flange 236 to pass through the lid. While the lid 224 is attached to the base 222, the flange 236 may retain the dome 226 in place against the base 222.

A light circuit 240 may be mounted on a surface of the base 222 and covered by the dome 226. The light circuit 240 generally comprises multiple (e.g., four) light sources 242a-242d. In various embodiments, the light sources may be implemented with light-emitting diodes. The light sources 242a-242d may be electrically connected to pins in the connector 228. The connector 228 may electrically connect the light sources 242a-242d to the driver 122.

Lasers are commonly used to project structured light in standard applications. However, lasers are limited to project a consistent pattern among a limited range of distances and angles. Using the light projector 102 approach, the light sources 242a-242d like the light-emitting diodes may be used. The light-emitting diodes may enhance an effective distance range up to 10 meters and an angular range up to, but not limited to, 180 degrees in two dimensions (e.g., horizontal and vertical).

The use of low power light sources 242a-242d, such as light emitting diodes, may achieve an advantage over the use of lasers that are bigger and consume more power. The low power feature and/or the low size feature may be particularly important for automotive or mobile applications where the power available and mounting space are limited.

The apparatus 100 generally provides a low cost-low power way to provide a textured projected light that may improve stereo vision in an automotive compatible range. The apparatus 100 may be implemented one or more light projectors 102 in order to expand the illumination field up to cover even the field of view framed by a fisheye lens. Thus, the apparatus 100 be used to improve night results for both pinhole and fisheye-type stereo cameras 104. The light projector 102 of the invention may be a lower cost and a lower size technology compared with lasers solution. The light projector 102 may provide a low power way to provide the textured projected light to improve stereo vision. The scene may be illuminated by the textured projected light for the stereo camera 104. In applications where light sources 242a-242d with a near infrared radiation range are implemented, the scene generally remains dark for human eyes. The light projector 102 and the stereo camera 104 may be build water proof and/or automotive grade, depending on the application needs.

The functions performed by the diagrams of FIGS. 1-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s).

Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus for enhancing stereoscopic imaging comprising:
a light projector comprising a base, a hemispherical shaped dome mounted on a first surface of said base by an annular flange around a bottom of the hemispherical shaped dome, and a light circuit mounted on said first surface of said base within a hemispherical space defined by said first surface of said base and an inner surface of said hemispherical shaped dome, wherein (i) said light circuit comprises a light-emitting diode configured to generate light, (ii) said hemispherical shaped dome is transparent to said light and comprises (a) first areas to create a background portion of a pattern of said light and (b) second areas to create a textured portion of said pattern of said light, (iii) said light projector is configured to project said pattern of said light in a direction, (iv) said background portion of said pattern of said light illuminates an area along said direction, and (v) said textured portion of said pattern of said light varies an intensity of said light in said area;

a stereo camera configured to capture two sequences of synchronized images of said area; and a control circuit configured to (i) control power to said light projector, (ii) receive said two sequences of synchronized images from said stereo camera and (iii) generate one or more output signals in response to said two sequences of synchronized images, wherein (a) at least one of said output signals comprises disparity images based on said two sequences of synchronized images and (b) said textured portion of said pattern provides an optical structure used during generation of said disparity images from said two sequences of synchronized images.

2. The apparatus according to claim 1, wherein (i) said light projected from said light projector comprises at least one of infrared light, visible light or both infrared and visible light, and (ii) said stereo camera is sensitive to said light as projected.

3. The apparatus according to claim 1, wherein said light projected from said light projector has an angular range up to 180 degrees in two directions.

4. The apparatus according to claim 1, wherein:
said control circuit is further configured to generate a dimming signal that controls said intensity of said light generated by said light projector; and
said dimming signal is communicated to said light projector via a connector mounted on a second surface of said base.

5. The apparatus according to claim 4, wherein said control circuit is further configured to (i) receive a control signal from a user interface device and (ii) generate said dimming signal in response to said control signal.

6. The apparatus according to claim 4, wherein said control circuit is further configured to (i) generate a sequence of said disparity images from said two sequences of synchronized images and (ii) generate said dimming signal in response to said sequence of said disparity images.

7. The apparatus according to claim 4, further comprising a light sensor configured to (i) generate a brightness signal by detecting an ambient light and (ii) present said brightness signal to said control circuit.

8. The apparatus according to claim 7, wherein said control circuit is further configured to control said intensity of said light generated by said light projector in response to said brightness signal.

9. A method for enhancing stereoscopic imaging, comprising the steps of:
controlling power to a light projector comprising a base, a hemispherical shaped dome mounted on a first surface of said base by an annular flange around a bottom of the hemispherical shaped dome, and a light circuit mounted on said first surface of said base within a hemispherical space defined by said first surface of said base and an inner surface of said hemispherical shaped dome, wherein (i) said light circuit comprises a light-emitting diode configured to generate light, and (ii) said hemispherical shaped dome is transparent to said light and comprises (a) first areas to create a background portion of a pattern of said light and (b) second areas to create a textured portion of said pattern of said light;
projecting said pattern of said light in a direction using said light projector, wherein said background portion of said pattern of said light illuminates an area along said direction and said textured portion of said pattern of said light varies an intensity of said light in said area;
capturing two sequences of synchronized images of said area with a stereo camera;
receiving at a control circuit said two sequences of synchronized images from said stereo camera; and
generating, using said control circuit, one or more output signals in response to said two sequences of synchronized images, wherein (a) at least one of said output signals comprises disparity images based on said two sequences of synchronized images and (b) said textured portion of said pattern provides an optical structure used during generation of said disparity images from said two sequences of synchronized images.

10. The method according to claim 9, wherein (i) said light projected from said light projector comprises at least one of infrared light, visible light or both infrared and visible light, and (ii) said stereo camera is sensitive to said light as projected.

11. The method according to claim 9, wherein said light projected from said light projector has an angular range up to 180 degrees in two directions.

12. The method according to claim 9, further comprising the step of:
generating a dimming signal that controls an intensity of said light generated by said light projector; and
communicating said dimming signal to said light projector via a connector mounted on a second surface of said base.

13. The method according to claim 12, further comprising the steps of:
receiving a control signal from a user interface device; and
generating said dimming signal in response to said control signal.

14. The method according to claim 12, further comprising the steps of:
generating a sequence of said disparity images from said two sequences of synchronized images; and
generating said dimming signal in response to said sequence of said disparity images.

15. The method according to claim 12, further comprising the steps of:
generating a brightness signal by detecting an ambient light; and
receiving said brightness signal at said control circuit.

16. The apparatus according to claim 1, wherein said textured portion of said pattern comprises spatially random features.

17. The apparatus according to claim 1, wherein said background portion of said pattern provides a uniform illumination of said area.

18. The apparatus according to claim 1, wherein said hemispherical shaped dome is implemented having a varying thickness configured to bend rays of said light.

19. The apparatus according to claim 18, wherein said varying thickness of said hemispherical shaped dome bends said rays to expand said light to cover a field of view of fisheye lenses implemented by said stereo camera.

20. The apparatus according to claim 18, wherein said varying thickness of said hemispherical shaped dome is (a)

thin at a top central portion of said hemispherical shaped dome and (b) thick near said bottom of said hemispherical shaped dome.

* * * * *